Oct. 18, 1960    D. T. BISCEGLIA ET AL    2,956,456
BORING BAR FOR PROFILING THE INTERIOR OF HOLLOW MEMBERS
Filed April 16, 1959    5 Sheets-Sheet 2
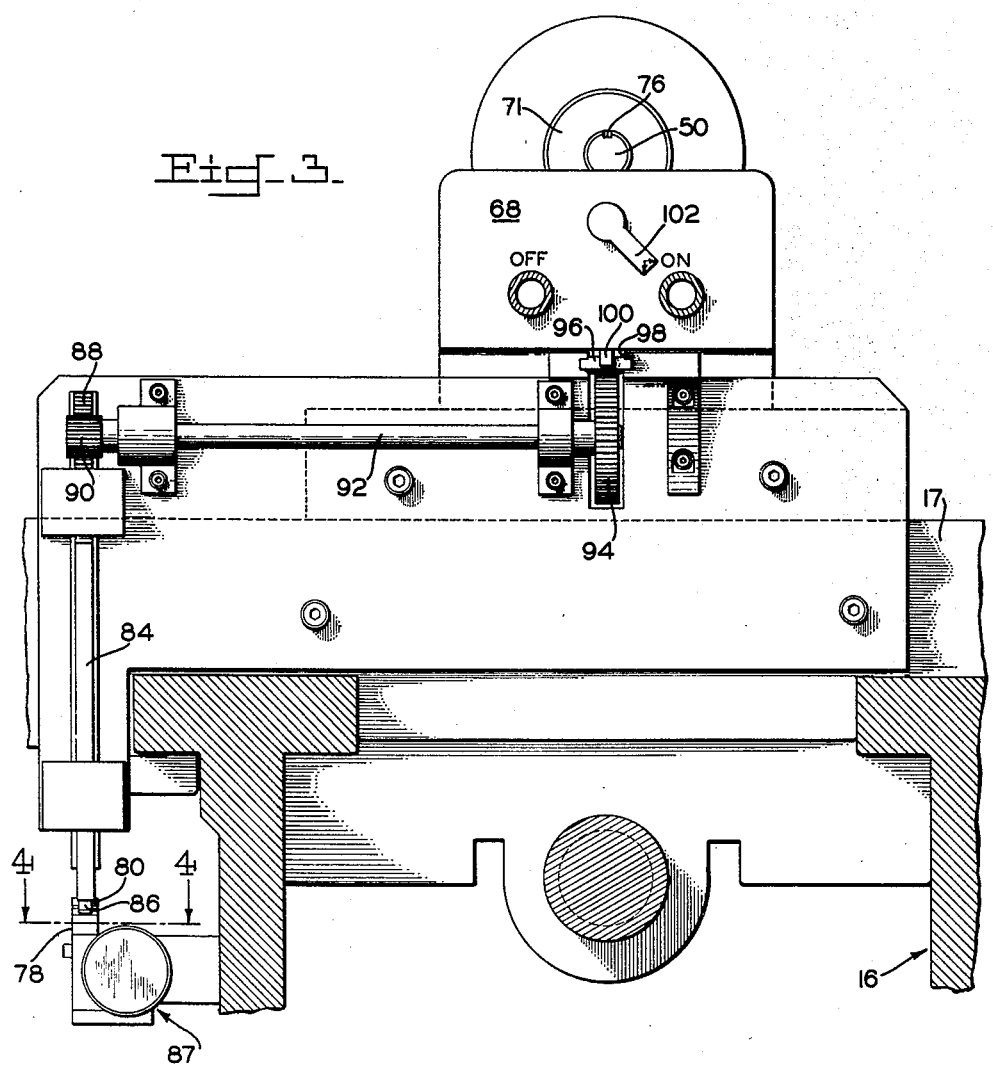
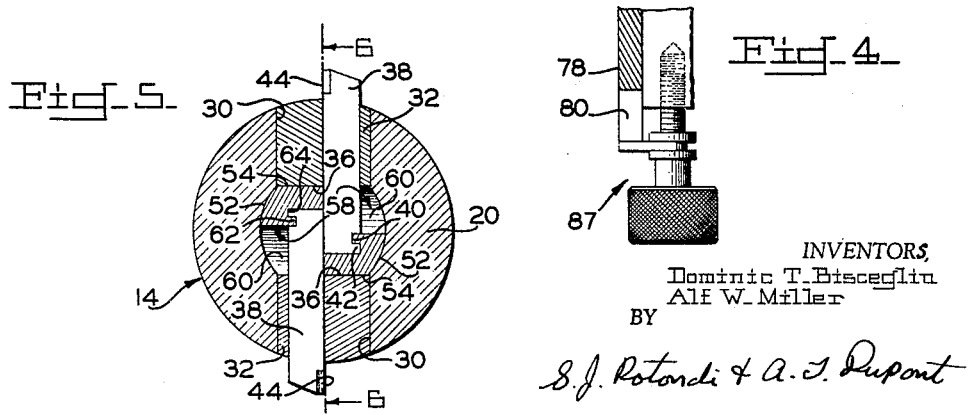
INVENTORS,
Dominic T. Bisceglia
Alf W. Miller
BY
S.J. Rotondi & A.J. Dupont

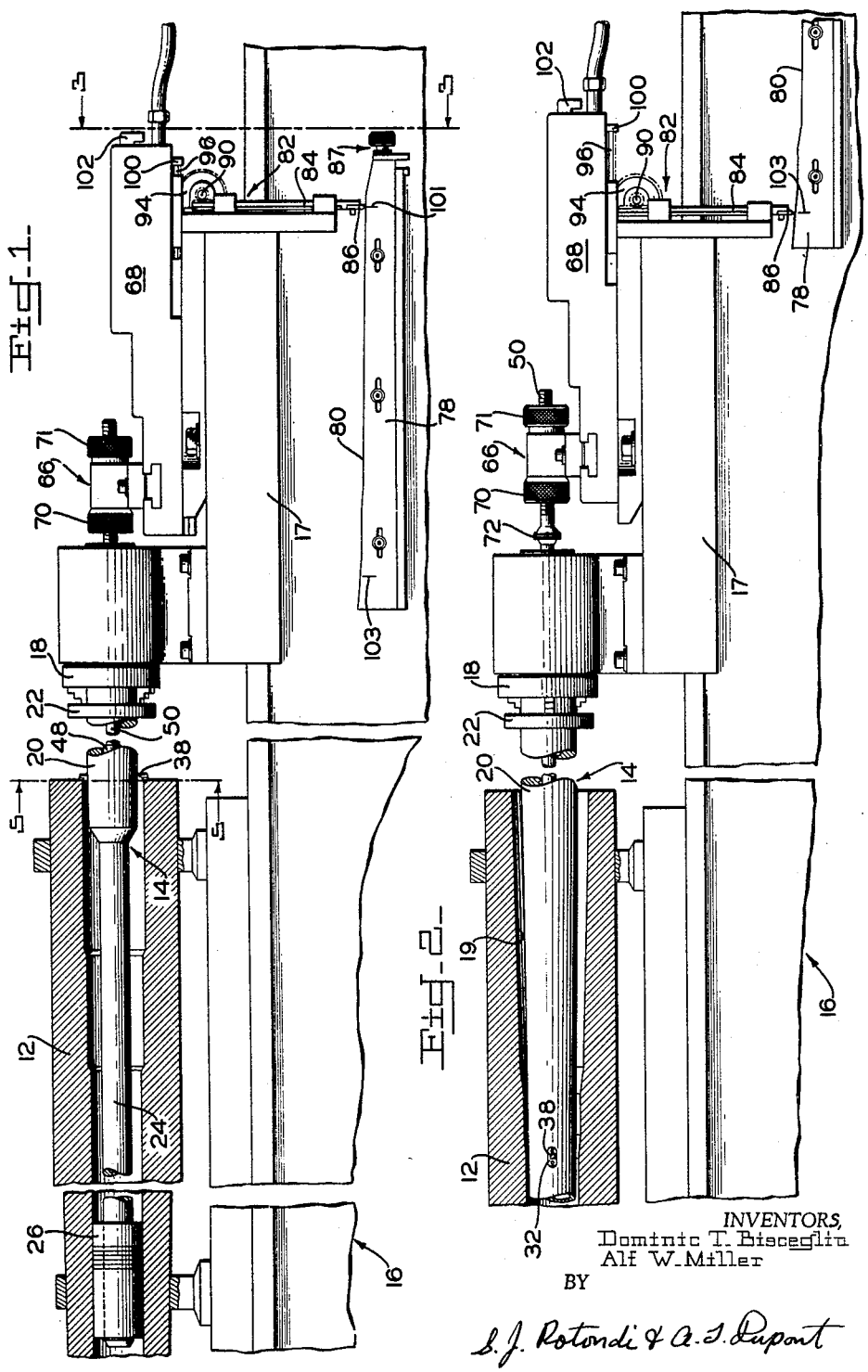

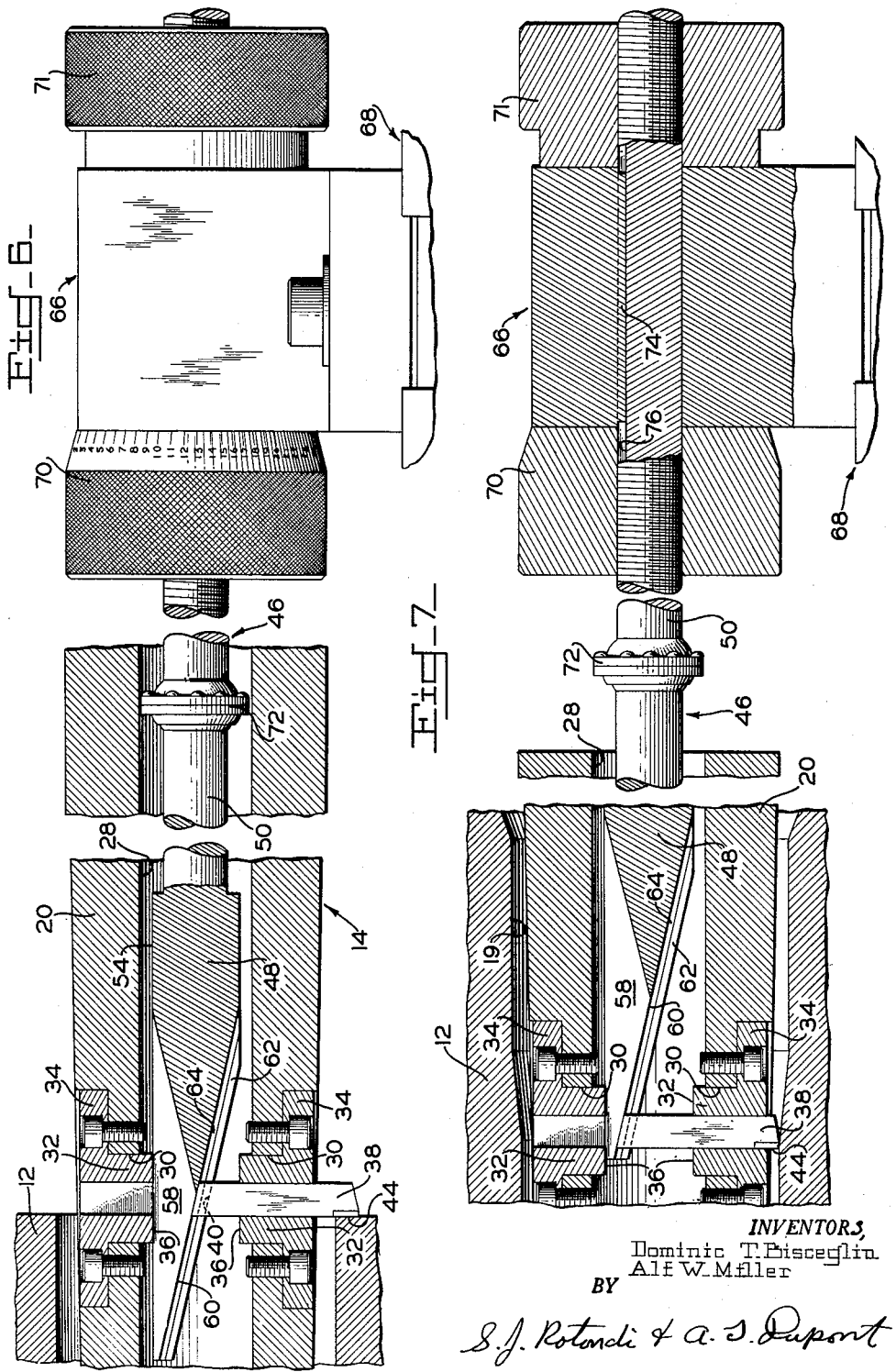

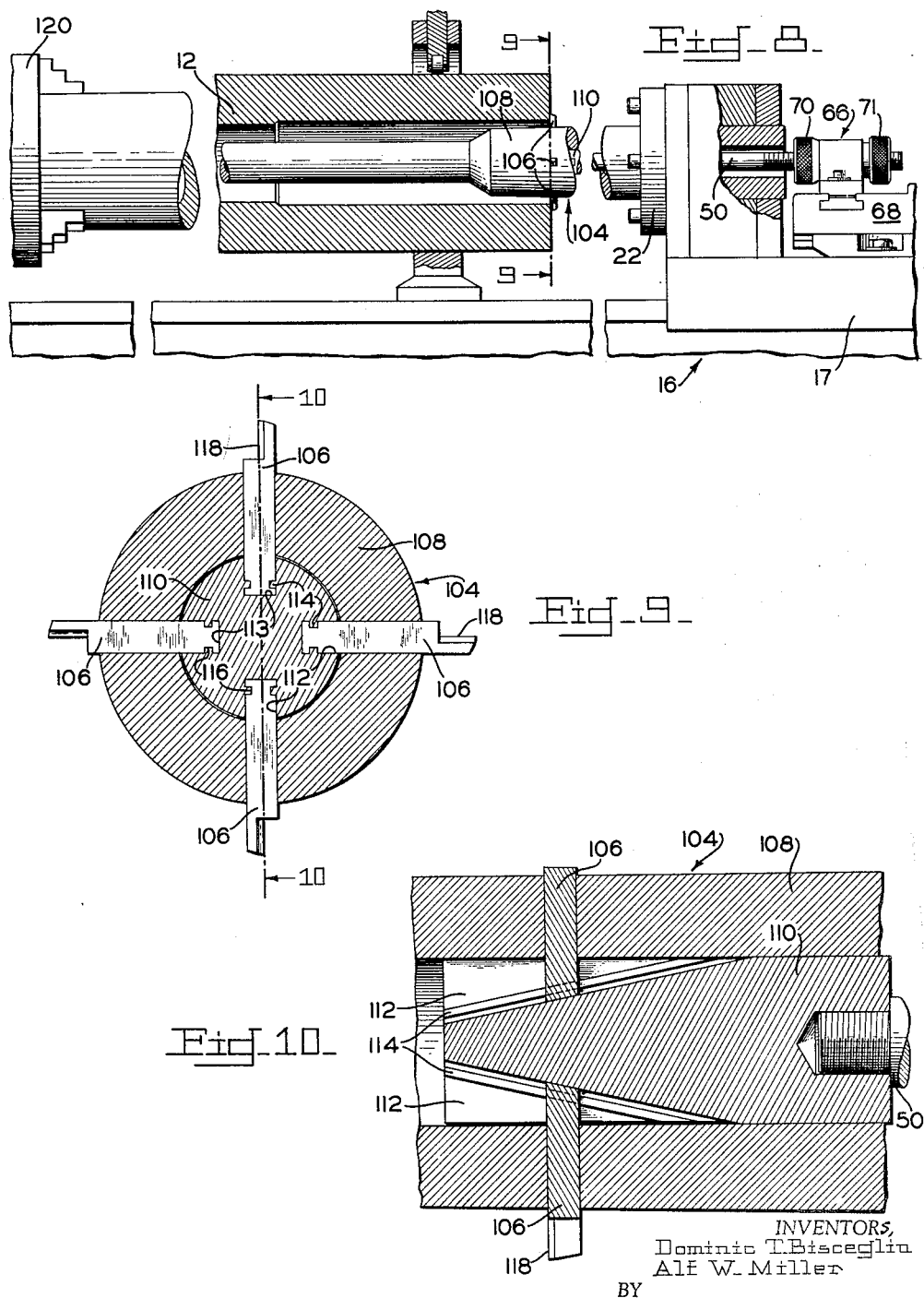

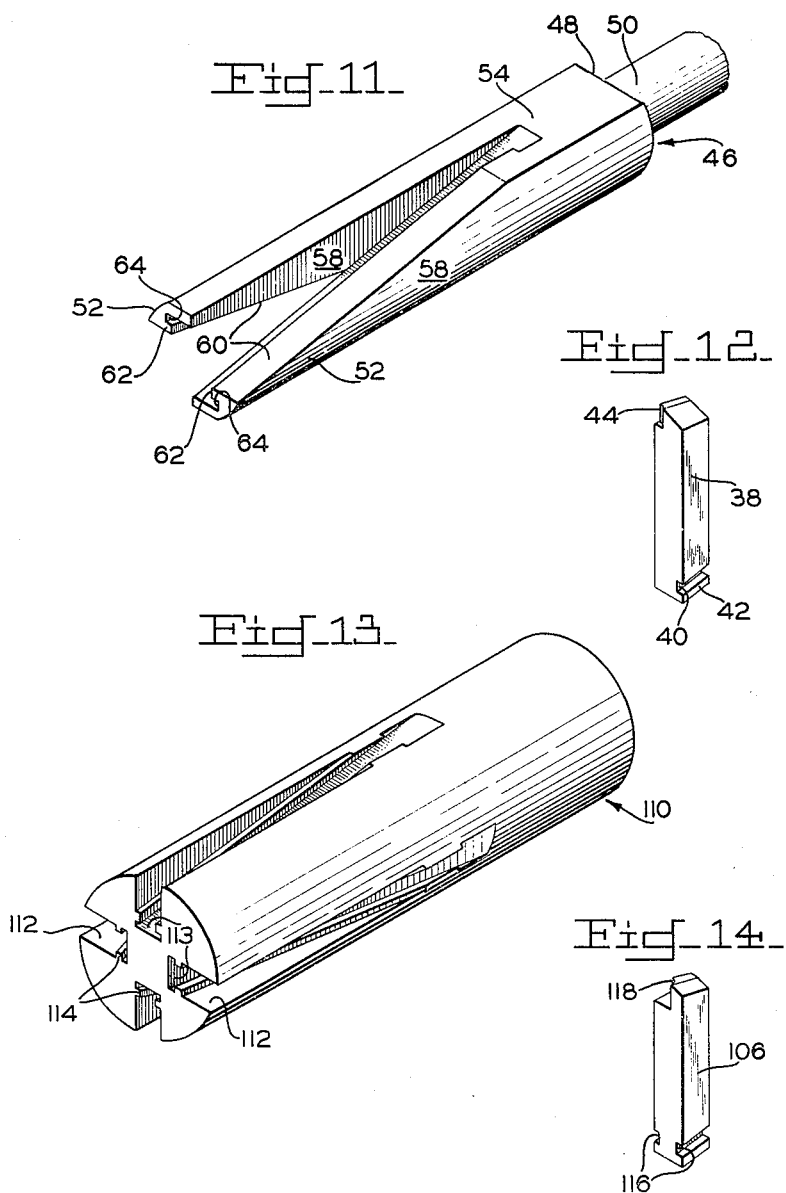

United States Patent Office 2,956,456
Patented Oct. 18, 1960

2,956,456

BORING BAR FOR PROFILING THE INTERIOR OF HOLLOW MEMBERS

Dominic T. Bisceglia and Alf W. Miller, Troy, N.Y., assignors to the United States of America as represented by the Secretary of the Army Filed Apr. 16, 1959, Ser. No. 806,988

2 Claims. (Cl. 77—58)

(Granted under Title 35, U.S. Code (1952), sec. 266)

The invention described herein may be manufactured and used by or for the Government for governmental purposes without the payment of any royalty thereon.

This invention relates generally to boring bars and more particularly to boring bars for counterboring a hole to a predetermined contour such as that of the powder chamber in a cannon barrel.

The powder chambers in cannon barrels are formed by sections of different diameters which are joined by blending tapered sections and the conventional way of forming these chambers has been by a piloted reamer the cutters of which are ground to the circumferential contour of the chamber. The maintenance of these reamers, however, is costly as the cutters must be precision formed to the desired contour with each regrind.

Efforts have been made in the art to overcome this costly maintenance by forming the chambers through internal profiling means, using a master templet to controllably position a cutting tool radially while at the same time being advanced longitudinally into a previously formed bore. But the desired precision achieved by the contoured reamer has not heretofore been approximated.

Contour turning of exterior cylindrical surfaces has advanced to where the reproduction of a master templet may be held to a very close tolerance on the diameter of the finished work. However, interior profiling has not reflected the same progress because of deflections in the boring bar while forming the contoured chamber. Moreover, it has previously been necessary to rotate the barrels when forming the powder chambers therein by internal profiling means and this is not convenient when the chambers are to be formed in long or large caliber barrels of cannon type, or those of coaxial multi-barrel type.

It is, therefore, an object of this invention to provide a boring bar device which will reproduce to a close tolerance the contour of a master templet by providing supports at both ends of the boring bar and a pair of diametrically aligned cutting tools, which produced a balanced radial thrust when cutting the chamber, whereby such structure produces a minimum of deflection in the boring bar.

It is another object of this invention to provide such a boring bar device which is adaptable for use in either a rotating or stationary workpiece.

It is another object of this invention to provide such a boring bar device wherein a plurality of diametrically aligned cutters may be utilized when desirable because of the size of the chamber to be formed.

The specific nature of the invention as well as other objects and advantages thereof will clearly appear from a description of a preferred embodiment as shown in the accompanying drawings in which:

Fig. 1 is a partially cross-sectioned side view showing the boring bar mounted for forming a powder chamber in a nonrotating barrel and the means for controlling the positions of the cutting tools to reproduce the contours of a master templet;

Fig. 2 is a view similar to Fig. 1 but showing the powder chamber formed;

Fig. 3 is an enlarged end view taken along line 3—3 of Fig. 1;

Fig. 4 is a view taken off line 4—4 of Fig. 3;

Fig. 5 is an enlarged view taken off line 5—5 of Fig. 1;

Fig. 6 is an enlarged longitudinally cross-sectioned and fragmented side view of the boring bar adapted to form a contoured chamber in a rotating workpiece with the cutting tools in a partially extended position and showing in elevation the mount for adjusting the longitudinal position of the control bar;

Fig. 7 is a view similar to Fig. 6 but showing the tools in retracted position and the mount in cross-section;

Fig. 8 is a partially cross-sectioned side view of the boring bar mounted to a lathe for forming a contoured chamber in a rotating workpiece and with the boring bar adapted for four cutting tools;

Fig. 9 is a view taken off line 9—9 of Fig. 8;

Fig. 10 is a view taken off line 10—10 of Fig. 9;

Fig. 11 is a perspective view of the head of the control bar adapted for use with two cutting tools;

Fig. 12 is a perspective view of the cutting tool for the head illustrated in Fig. 11;

Fig. 13 is a perspective view of the head of the control bar adapted for use with four cutting tools; and Fig. 14 is a perspective view of the cutting tool for use with the head illustrated in Fig. 13.

Shown in the figures is a bored cannon barrel 12 which is horizontally mounted on suitable supports of a lathe 16 and is secured thereto against rotation. A boring bar 14 is secured at the rear end by means of a chuck 18 for rotation thereby and such chuck is mounted on a carriage 17 slidably disposed on the base of lathe 16 for coaxial insertion into the breech end of barrel 12 to form therein a powder chamber 19 of predetermined contour.

Boring bar 14 includes a tube 20 which is tapered to generally conform to the overall configuration of chamber 19 so as to be receivable therein while being formed. An annular flange 22 on tube 20 contacts the end of chuck 18 facing barrel 12 to prevent the tube from slipping in chuck 18 during longitudinal movement thereof towards the barrel. As best shown in Fig. 1, tube 20 is provided at the front end with a reduced diameter pilot portion 24 which is slidingly and rotatably received by an expandable pilot bearing 26 after such pilot bearing is inserted into the bore of barrel 12 and expanded into engagement therewith. Thus, the front end of tube 20 is restrained from radial displacement relative to barrel 12.

Extending forwardly from the rear end of tube 20 is an axial bore 28 which communicates with a cylindrical opening 30 extending diametrically through the tube. Mounted in each end of opening 30 is a bushing 32 including a flange portion 34 which is received by suitable recesses in the outside of tube 20 to provide means for securing the bushing to the tube. The bushings 32, as best shown in Figs. 6 and 7, extend partially into bore 28 and the inner ends, noted at 36, are squared off relative to the longitudinal axis of the bushings for a purpose to be explained.

Each of the bushings 32 supports for sliding lateral movement a cutting tool 38 which is rectangular in cross-section and such tools are disposed in the bushings for relative parallel movement and sliding engagement of the adjacent sides of the tools. Provided respectively in the sides of each of the tools 38, which are opposite those in sliding contact, is a rectangular channel 40 which is spaced from the inner end of the tool to form a tongue 42. Such channel 40 extends rearwardly relative to tube 20 and towards the outer end of the tool 38 from the front side thereof so that the ratio of the longitudinal distance to the lateral is four to one. The inner ends of tools 38 are disposed parallel to the channel 40 respective thereto and, therefore, tongues 42 have the same inclinations as the channels. A cutting edge 44 is provided on the leading, outer end portion of each tool 38 for cutting material from barrel 12 to form chamber 19 during the insertion of boring bar 14 into the barrel and, as is best shown in Fig. 5, such cutting edges are diametrically aligned to produce a balanced radial thrust during such cutting operation.

The tools 38 are actuated laterally by a control bar 46 which extends into bore 28 for cooperation with the tools as hereinafter described and such control bar includes a head 48 and a shaft 50 extending rearwardly therefrom. Head 48 is formed to include a pair of opposed cylindrical surfaces 52 having the same diameter as bore 28 so as to slidingly mate therewith and a pair of parallel flats 54 which slidingly engage inner ends 56 of the bushings 32 to prevent rotation of such head relative to tube 20.

Head 48 is bifurcated between the flats 54 to form a pair of cam guides 58 each of which controls the position of one of the tools 38. The side of each of the guides 58 facing the related one of the tools 38, and which is noted at 60, is angularly disposed respective thereto and extends rearwardly and towards the related tool at a four to one ratio, similar to the angularity of channel 40. The width of side 60 is reduced and then undercut to form a flange 62 which is slidingly received by channel 40 of the related tool 38 and a groove 64 which slidingly receives tongue 42 of such tool. Whereby, tools 38 and head 48 are securely interlocked and longitudinal movement of the head is cammingly converted to lateral movement of the tools at a four to one ratio.

Shaft 50 is threaded at the rear end and such threaded portion is slidingly received by a mount 66 fixedly disposed on a conventional unit 68, such as a Hydra-trace, which is slidingly disposed on carriage 17 for longitudinal movement respective to chuck 18 and is actuatable with a constant force responsive to hydraulic pressure applied thereto by conventional means. Mount 66 includes a vernier 70, which threadingly engages the threaded portion of shaft 50 for closely adjusting the longitudinal position of control bar 46 respective to the mount, and a lock nut 71 for securing the control rod in the adjusted position. Shaft 50 is interrupted by a slip joint 72 which permits rotation of head 48 with boring bar 14 while the rear end of shaft 50 mounted to mount 66 is nonrotatable. A key portion 74 in mount 66 slidingly cooperates with a groove 76 in the rear end of shaft 50, as best shown in Fig. 7, to prevent rotation thereof while being longitudinally displaceable.

The cutters 38 are controllably positioned to form powder chamber 19 to the desired contour by a templet 78, side 80 of which is profiled according to the predetermined contour, and a tracer device 82 for translating the profile of side 80 to the tools 38 while tube 20 is moved into barrel 12 by carriage 17.

Templet 78 is mounted below the bed of lathe 16 and parallel to the path of movement of tube 20 with side 80 upwardly disposed. Templet 78 is disposed for limited longitudinal displacement along lathe 16 and an adjusting device 87, shown in detail in Fig. 4, permits adjustable indexing of such templet.

A bar 84 is vertically mounted to carriage 17 above templet 78 for sliding vertical movement relative thereto. A tracer 86 is adjustably mounted to the lower end of bar 84 for sliding contact with side 80 of templet 78 and for movement therealong as boring bar 14 is advanced into barrel 12. Provided on the upper portion of bar 84 are rack teeth 88 which meshingly engage with a pinion 90 mounted to the adjacent end of a rotatable shaft 92 laterally mounted to carriage 17. A second pinion 94 having four times as large a circumference as that of pinion 90 is mounted to the opposite end of shaft 92 and such second pinion has meshing engagement with a rack 96 mounted to carriage 17 for free longitudinal movement relative thereto by means of a T-slot 98 which slidingly supports such rack and permits engagement of second pinion 94 therewith.

A stylus 100 extends from unit 68 for engagement with the rear end of rack 96 so that when a source of hydraulic pressure, not shown, is connected to the unit by means of valve 102, the unit is moved forwardly for engaging the stylus to the end of the rack and applying a constant pressure, adjusted to four pounds, against the rack to preload the linkage of tracer device 82 to templet 78 and thereby eliminate the accumulation of any tolerances in such linkage. The engagement of stylus 100 with the rear end of rack 96 also serves to actuate unit 68 rearwardly through the upward movement of tracer 86 while being moved along profiled side 80 of templet 78. As mount 66 is fixedly disposed on unit 68, the rearward displacement thereof by templet 78 through tracer device 82 retracts control bar 46 in tube 20 and thereby moves the tools 38 inwardly. With the longitudinal-lateral relationship of head 48 and tools 38 being four to one and the ratio of second pinion 92 and pinion 88 being also four to one the distance of movement of the tools corresponds exactly to that of tracer 86.

Thus, when barrel 12 is to be counterbored to form the powder chamber 19 of predetermined contours therein, the barrel is mounted to lathe 16 so that the breech end thereof is within ½ inch of a predetermined longitudinal position relative to the tools 38. Variations from the predetermined position are compensated for by adjusting the longitudinal position of templet 78 by means of adjusting device 87 until an index mark 101 thereon lines up with tracer 86. Pilot bearing 26 is then inserted, located and expanded in the proper position in the bore of barrel 12 and carriage 17 is then moved forwardly to insert pilot portion 24 of tube 20 into such pilot bearing.

Valve 102 is then turned to "on" position whereupon unit 68 is moved forwardly to engage stylus 100 thereon with rack 96 and to move control bar 46 forwardly to expand tools 38 for the initial cut into barrel 12. At this point the longitudinal position of control bar 46 is adjusted by vernier 70 until the tools 38 are diametrically positioned for the initial cut and then the control bar is locked in position by lock nut 71.

Carriage 17 is then actuated for forward movement towards barrel 12. As carriage 17 advances, tracer 86 moves along side 80 of templet 78 and responds vertically to the profile of such side. The vertical movement of tracer 86 moves rack 96 longitudinally against stylus 100 of unit 68 which responds accordingly to retract control bar 46 in tube 20 and so actuate tools 38 thereinto to reproduce the profile of templet 78.

When powder chamber 19 is formed, which is indicated by the position of tracer 86 relative to a suitable index marking 103 on templet 78, valve 102 is turned to "off" position. Thereby, unit 68 is returned to its extreme rear position, retracting control bar 46 and thereby tools 38 so that boring bar 14 may be withdrawn from barrel 12 without danger of the tools scoring the formed powder chamber.

In Figs. 8–10 and 13–14, there is shown a boring bar 104 adapted for forming the powder chamber 17 when barrel 12 is mounted for rotation and where it is advisable because of the size of the powder chamber to use more than a pair of cutting tools. In this embodiment four cutting tools 106 are symmetrically disposed in a tube 108 and are slidingly mounted therein for lateral displacement.

The inner ends of the tools 106 are slidingly received in mating recessed cam guides 112 which are provided in a cylindrical head 110, which guides form an inner wall 113 that extends rearwardly and outwardly from the front end of the head so that the ratio of the longitudinal distance to the lateral is four to one. The tools 106 are slidingly retained in the guides 112 by means of flanges 114 which extend inwardly from the side walls of the guides and which are slidingly received by mating channels 116 in the adjacent sides of the tools 106. The tools 106 respectively include a cutting edge 118 which is diametrically opposed to that of the opposite one of the tools when installed in tube 108 for a balanced radial thrust.

In this embodiment, barrel 12 is mounted to lathe 16 for rotation by means of a chuck 120 and boring bar 104 is secured against rotation to the lathe. As boring bar 104 is non-rotatable there is no need for a slip joint in shaft 50 although it may be retained thereon. Otherwise, the embodiment is essentially similar to that previously described.

From the foregoing, it is clearly apparent that there is provided herein a boring bar device, for forming chambers of predetermined contours, which is readily adapted to form such chambers in either a rotating or non-rotating workpiece and which accurately reproduces the profile contour of a master templet by providing supports at both ends of the boring bar and a plurality of cutting tools disposed in pairs so that the cutting edges thereon may be diametrically opposed to produce a balanced radial thrust during the cutting operation to prevent deflections in the tube.

Although a particular embodiment of the invention has been described in detail herein, it is evident that many variations may be devised within the spirit and scope thereof and the following claims are intended to include such variations.

We claim:

1. A boring bar device for enlarging a bore in a workpiece to form a chamber according to a contour represented in profile on a templet mounted to a lathe, said boring bar device including in combination a tube including a forward pilot portion, means for mounting said tube for rotation and for longitudinal advancement into the bore of the workpiece, a bearing engageable with the bore for supporting said pilot portion to coaxially align said tube with the bore, an axial bore extending forwardly from the rear end of said tube for communication with a diametrical cylindrical opening therethrough, a bushing mounted to said tube at each end of said opening for extension into the bore and being respectively provided with an inner end squared off respective to the longitudinal axis of said bushing, a control bar mounted for longitudinal displacement in the bore of said tube, said control bar including a head provided with a pair of cylindrical surfaces slidingly engageable with the circumference of the bore in said tube and a pair of flats disposed relatively between said cylindrical surfaces for sliding engagement with said inner ends of said bushings to prevent rotation of said control bar respective to said tube, a pair of cam guides formed by a bifurcation of said head through said flats, a cutting tool including a cutting edge mounted through each of said bushings for engagement of the inner end of each of said cutting tools with the corresponding one of said cam guides and for diametrical alignment of said cutting edges, cooperating tongue and groove means on each of said tools and the related one of said cam guides for slidably interlocking said cutting tools thereto, said cooperating tongue and groove means being angularly disposed for converting longitudinal displacement of said control bar to lateral movement of said tools, a non-rotatable mount mounted to said lathe for longitudinal movement relative to said tube and so as to receive the rear end of a shaft extending rearwardly from said head, a slip joint interrupting said shaft to permit rotation of said head and non-rotating connection of the rear end of said shaft to said mount, thread means disposed on the rear end of said shaft for cooperation with thread means on a vernier device mounted on said mount for adjusting the longitudinal position of said head, a tracer disposed for movement with said tube and for sliding engagement with said templet to displaceably follow the predetermined contour thereon, and means for converting vertical displacement of said tracer by the templet to longitudinal displacement of said mount for actuating said cutting tools to reproduce the predetermined contour of the templet in the workpiece as said tube is advanced thereinto.

2. A boring bar including a rotatable tube having an axial bore extending forwardly from the rear end thereof for communication with a cylindrical opening disposed diametrically through said tube, a pair of bushings fitted into the opposite ends of said opening for extension into the bore, each of said bushings being provided with an inner end squared off respective to the longitudinal axis thereof, a control bar slidingly disposed in the bore for longitudinal displacement therein, said control bar including a head provided with a pair of cylindrical surfaces having the same radius as the bore and a pair of flats disposed respectively between said cylindrical surfaces for sliding contact with said inner ends of said bushings to prevent rotation of said head respective to said tube, said head being bifurcated between said flats to form a pair of guide portions, an angular side formed on each of said guide portions, said angular sides being formed to extend rearwardly and oppositely at a predetermined angle from the front end of said head to said flats, a pair of cutting tools, a cutting edge formed at the front end of one side of each of said cutting tools, said cutting tools being slidingly disposed through said bushings for sliding engagement of the sides of said cutting tools for diametrical disposition of said cutting edges, and interlocking flange and groove means provided at the rear ends of said cutting tools and along said angular sides of said guide portions for translating longitudinal displacement of said control bar to lateral displacement of said cutting tools according to the predetermined angle of said angular sides.

References Cited in the file of this patent

UNITED STATES PATENTS

| 1,172,781 | Forsyth et al. | Feb. 22, 1916 |
| 1,233,994 | Dow | July 17, 1917 |
| 2,219,232 | Lindig | Oct. 22, 1940 |
| 2,430,026 | Mealey | Nov. 4, 1947 |
| 2,784,649 | Von Zelewsky | Mar. 12, 1957 |

FOREIGN PATENTS

| 45,665 | Germany | Dec. 20, 1888 |